United States Patent
Beals et al.

(10) Patent No.: US 12,246,343 B2
(45) Date of Patent: Mar. 11, 2025

(54) SURFACE TREATMENT FOR AQUEOUS SLURRY-BASED ENVIRONMENTAL BARRIER COATING

(71) Applicant: Raytheon Technologies Corporation, Farmington, CT (US)

(72) Inventors: James T. Beals, West Hartford, CT (US); Tania Bhatia Kashyap, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/120,686

(22) Filed: Mar. 13, 2023

(65) Prior Publication Data

US 2023/0211374 A1   Jul. 6, 2023

Related U.S. Application Data

(63) Continuation of application No. 15/998,733, filed on Aug. 16, 2018, now abandoned.

(51) Int. Cl.
*B05D 3/14* (2006.01)
*F01D 5/28* (2006.01)

(52) U.S. Cl.
CPC ............ *B05D 3/142* (2013.01); *F01D 5/288* (2013.01); *F05D 2230/90* (2013.01); *F05D 2240/12* (2013.01); *F05D 2240/30* (2013.01); *F05D 2300/6033* (2013.01); *F05D 2300/611* (2013.01)

(58) Field of Classification Search
None
See application file for complete search history.

(56) References Cited

U.S. PATENT DOCUMENTS

| | | | | |
|---|---|---|---|---|
| 5,389,195 A | * | 2/1995 | Ouderkirk | B29C 59/14 427/535 |
| 5,652,044 A | * | 7/1997 | Rickerby | C23C 10/48 428/615 |
| 6,300,641 B1 | * | 10/2001 | Koh | C08J 7/12 427/527 |
| 8,124,252 B2 | | 2/2012 | Cybulsky et al. | |
| 8,697,195 B2 | * | 4/2014 | Bucci | C23C 10/48 427/535 |

(Continued)

OTHER PUBLICATIONS

Thorton & Greene (1994). Plasmas in Deposition Processes. In. Bunshah (2nd Edition). Handbook of Deposition Technologies for Films and Coatings. Noyes Publications (Year: 1994).*

(Continued)

*Primary Examiner* — Jose I Hernandez-Kenney
(74) *Attorney, Agent, or Firm* — Bachman & LaPointe, P.C.

(57) ABSTRACT

A method for coating a ceramic matrix composite substrate with an environmental barrier coating includes the steps of: treating a surface of a ceramic matrix composite substrate to adjust wettability of the surface; and applying an aqueous slurry-based environmental barrier coating to the surface. The treating step can be a plasma treatment to remove organic contaminants, and can also be a treatment to modify oxidative state of the surface. The treatment can produce a surface for treatment that is hydrophilic and has a contact angle with aqueous-slurry coating materials of less than 40 degrees.

13 Claims, 2 Drawing Sheets

(56) References Cited

U.S. PATENT DOCUMENTS

| | | | |
|---|---|---|---|
| 9,428,650 | B2 | 8/2016 | Meschter et al. |
| 2003/0054131 | A1 | 3/2003 | Ooshima et al. |
| 2009/0297718 | A1 | 12/2009 | Sarrafi-Nour et al. |
| 2016/0312628 | A1* | 10/2016 | Kirby ............... C04B 41/85 |
| 2017/0305797 | A1* | 10/2017 | Nasiri ............ C04B 35/62222 |

OTHER PUBLICATIONS

Smedley et al. USPAS Course on Photocathode Physics (2011), p. 13. Retrieved from https://uspas.fnal.gov/materials/12UTA/Cathode_5.pdf (Year: 2011).*

Vargas-Gonzalez et al. "Surface Modification of Ballistic Ceramic and Composite Materials by Use of Atmospheric Pressure Plasma" (2015). Ceramic Engineering and Science Proceedings, vol. 35 Issue: 4, pp. 23-35. Retrieved from https://web.p.ebscohost.com/ (Year: 2015).*

Vacuum. The Engineering Toolbox [Oct. 6, 2017 archived version from the wayback machine], retrieved from https://www.engineeringtoolbox.com/vacuum-d_837.html (Year: 2017).*

DiFelice. "An Investigation of Plasma Pretreatments and Plasma Polymerized Thin Films for Titanium/Polyimide Adhesion" (2001). Doctoral Dissertation. Virginia Polytechnic Institute and State University. UMI No. 3136598 (Year: 2001).*

Neyman et al. "Plasma and Silane Surface Modification of SiC/Si: Adhesion and Durability for the Epoxy-SiC System" (2006). The Journal of Adhesion, vol. 82: p. 331-353 (Year: 2006).*

Thermal silicon oxide. Material Property Database. MIT (2005), retrieved from http://www.mit.edu/-6.777/matprops/sio2.htm (Year: 2005).

Rodriguez-Santiago et al. "Modification of Silicon Carbide Surfaces by Atmospheric Pressure Plasma for Composite Applications" (2013). ACS Applied Materials & Interfaces, vol. 5, p. 4725-4730. DOI: 10.1021/am303227q (Year: 2013).

Sun et al. Comparison Between Different Ways in Making Silicon Dioxide Layer on Silicon Wafers (2017). MATEC Web of Conferences, 88, 01009. DOI: 10.1051/matecconf/20178801009 (Year: 2017).

Chen et al. "Water Adsorption on Hydrophilic and Hydrophobic Surfaces of Silicon" (2018). Journal of Physical Chemistry C, 122, 11385-11391 (Year: 2018).

Silica (silicon dioxide). (2014). In M. Clugston, The Penguin dictionary of science (4th ed.). Penguin. Credo Reference: https://search.credoreference.com/content/entry/penguinscience/silica_silicon_dioxide/0?institutionId=743 (Year: 2014).

Silica. (2014). In Collins Dictionaries (Ed.), Collins English Dictionary (12th ed.). Collins. Credo Reference: https://search.credoreference.com/content/entry/hcengdict/silica/0?institutionId=743 (Year: 2014).

Hydroxylation. (2014). In Collins Dictionaries (Ed.), Collins English Dictionary (12th ed.). Collins. Credo Reference: https://search.credoreference.com/content/entry/hcengdict/hydroxylation/0?institutionId=743 (Year: 2014).

* cited by examiner

SURFACE TREATMENT FOR AQUEOUS SLURRY-BASED ENVIRONMENTAL BARRIER COATING

BACKGROUND

The disclosure relates to environmental barrier coatings for articles or substrates containing silicon. The environmental barrier coating (EBC) functions as a protective environmental barrier coating and inhibits the formation of gaseous species of Si, particularly $Si(OH)_x$ when the article is exposed to a high temperature, aqueous (water and/or steam) environment.

Ceramic materials containing silicon and metal alloys containing silicon have been proposed for structures used in high temperature applications such as, for example, gas turbine engines, heat exchangers, internal combustion engines, and the like. A particularly useful application for these materials is in gas turbine engines which operate at high temperatures in aqueous environments. The light weight of the ceramic materials makes them desirable for such uses.

It has been found that these silicon containing substrates can recede and lose mass as a result of formation of volatile Si species, particularly $Si(OH)_x$ and SiO when exposed to high temperature, aqueous environments.

It is believed that the process involves oxidation of the silicon carbide to form silica on the surface of the silicon carbide followed by reaction of the silica with steam to form volatile species of silicon such as $Si(OH)_x$. Naturally it would be highly desirable to provide an environmental barrier coating for silicon containing substrates which would inhibit the formation of volatile silicon species, $Si(OH)_x$ and SiO, and thereby reduce recession and mass loss.

It would also be highly desirable to apply such environmental barrier coatings in a way which results in good bonding of the coating to the substrate.

SUMMARY

In accordance with the present disclosure, there is provided a method for coating a ceramic matrix composite substrate with an environmental barrier coating, comprising the steps of treating a surface of a ceramic matrix composite substrate to adjust wettability of the surface; and applying an aqueous slurry-based environmental barrier coating to the surface.

In one non-limiting configuration, the substrate is at least one of a turbine vane or a turbine blade.

In another non-limiting configuration, the surface has organic contaminants, and the treating step removes the organic contaminants.

In a further non-limiting configuration, the organic contaminants comprise absorbed hydrocarbons, surface contaminants from handling, machining and packaging, and residual contaminants from the manufacturing process.

In a still further non-limiting configuration, the treating step comprises changing the oxidative state of the surface to adjust wettability of the surface.

In still another non-limiting configuration, the treating step is a plasma treating step.

In another non-limiting configuration, the plasma treating step comprises placing the substrate in a chamber, evacuating the chamber, introducing process gas to the chamber, and generating plasma within the chamber.

In another non-limiting embodiment, the process gas is selected from the group consisting of fluorine gas, Sulphur hexafluoride, water vapor, hydrogen, chlorine gas, hydrochloric acid, argon, iodine monobromide (IBr), iodine monochloride (ICl) and combinations thereof.

In a further non-limiting configuration, the aqueous slurry-based coating comprises a mixture of water, binder, and oxidation protection phase.

In a still further non-limiting configuration, the treating step produces a surface that is hydrophilic.

In still another non-limiting configuration, the treating step produces a surface having a contact angle of less than 40 degrees with the aqueous slurry-based environmental barrier coating.

In another non-limiting configuration, the applying step is selected from the group consisting of spraying, dipping, electrophoretic application, painting and combinations thereof.

In a further non-limiting configuration, the method further comprises the step of applying environmental barrier coating materials to the surface as an aqueous-slurry, and curing the aqueous-slurry on the surface to produce the environmental barrier coating.

In another alternative configuration, the method further comprises applying a protective layer over the environmental barrier coating.

Other details of the coating method are set forth in the following detailed description and the accompanying drawings wherein like reference numerals depict like elements.

DETAILED DESCRIPTION

The disclosure relates to a method for controlled wetting during application of an aqueous slurry-based environmental barrier coating (EBC) to a silicon-containing substrate such as a ceramic matrix composite (CMC) substrate. The controlled wetting includes plasma treatment to remove organic surface contaminants from the surface of the substrate to be treated. Such contaminants can be hydrophobic, creating a high surface tension with the aqueous coating materials, and preventing wetting, which results in potentially low adherence of the resulting EBC.

An aqueous slurry as referred to herein generally has, as main constituent, an aqueous suspension of nanometer sized colloidal silica particles. This acts as an inorganic binder and holds other constituents of the slurry in place including but not limited to more water, gettering particles, and self-healing phase. Modifiers can be added including dispersants and surfactants.

Figure 1:
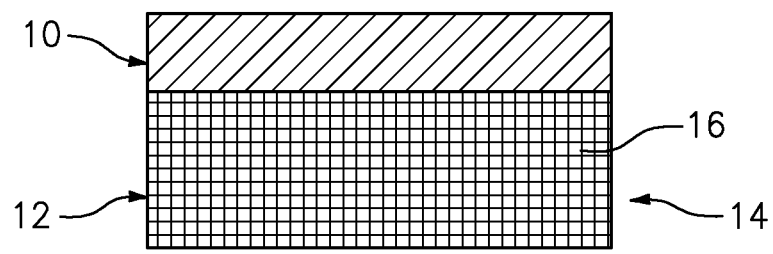
FIG. 1 is a cross section of an exemplary coating on a substrate containing silicon according to the disclosure.

Referring to FIG. 1, there is illustrated an environmental barrier coating 10 formed over a substrate 12 of an article 14. Coating 10 is configured to inhibit the formation of gaseous species of silicon when the article 14 is exposed to a high temperature, aqueous environment. The substrate 12 can be associated with articles 14 such as a turbine vane or a turbine blade, and/or any other component or components of a gas turbine engine, such as components in the hot section of the gas turbine engine, including rotating components and portions of combustors, and the like.

The substrate 12 can be constructed from materials containing silicon and can be a ceramic matrix composite material, a monolithic ceramic, a silicon-based or silicon containing ceramic substrate or a silicon containing metal alloy. In an exemplary embodiment, the substrate 12 can be silicon containing ceramic material such as, for example, silicon carbide, silicon nitride, silicon oxy-nitride and silicon aluminum oxy-nitride, alkaline earth or rare earth silicate glasses or glass ceramics and combinations thereof. Examples can include barium strontium aluminosilicate, strontium aluminosilicate, lithium aluminosilicate, aluminosilicate, mullite, yttrium silicate, ytterbium silicate, and the like. In accordance with a particular embodiment, the silicon containing ceramic substrate comprises a silicon containing matrix with reinforcing materials 16 such as fibers, particles and the like and, more particularly, a silicon based matrix which is fiber-reinforced. Particularly suitable ceramic substrates are a silicon carbide coated silicon carbide fiber-reinforced silicon carbide particle and silicon matrix, a carbon fiber-reinforced silicon carbide matrix and a silicon carbide fiber-reinforced silicon nitride matrix. Particularly useful silicon-metal alloys for use as substrates for the article 14 can include molybdenum-silicon alloys, niobium-silicon alloys, iron-silicon alloys, aluminum-silicon alloys, and silicon alloys with one or more of zirconium, hafnium, titanium, chromium, tungsten, boron, platinum and tantalum.

Figure 2:
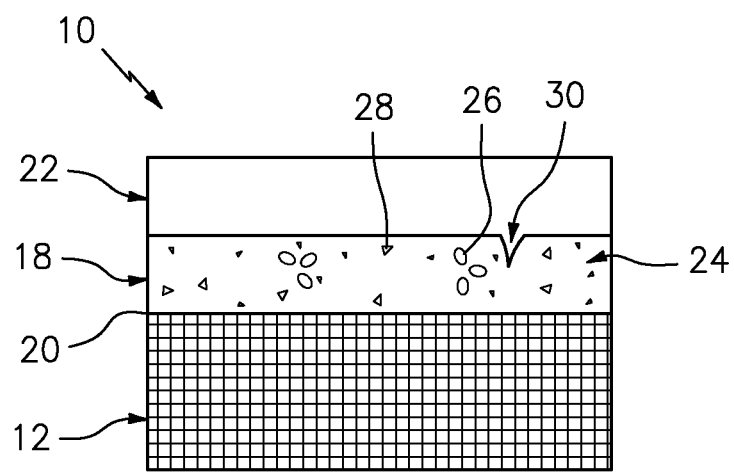
FIG. 2 is a cross section of an exemplary coating on a substrate containing silicon according to the disclosure.

Referring also to FIG. 2, an environmental barrier layer 18 can be applied to the substrate 14 on a surface 20. A protective layer 22 can be applied on the environmental barrier layer 18. The protective layer 22 can be configured to resist recession of the Si-containing volatile species when exposed to water vapor or steam. In an exemplary embodiment, the protective layer 22 can include binary or multi-component oxides such as $HfO_2$, $ZrO_2$, or $Gd_2Hf_2O_7$, $Gd_2Zr_2O_7$, and refractory metal oxides. In other exemplary embodiments, the protective layer 22 can include silicates with lower $SiO_2$ activities. In another exemplary embodiment the protective layer 22 can include rare earth (RE) monosilicates, disilicates and alkaline earth (AE) aluminosilicates, silicates of Hafnium and zirconium.

The present disclosure is directed to enhancing adhesion of aqueous slurry-based coatings on surface 20 of substrate 12. Such slurries can be applied by spraying, dipping, electrophoretic application, painting, and the like, and combinations thereof. In one non-limiting configuration, the resulting environmental barrier layer 18 can include an oxide matrix 24 and an oxidant getter phase 26 interspersed throughout the oxide matrix 24. The oxide matrix 24 can include a multi-phase mixture, such as a $SiO_2$ rich phase and a self-healing phase 28 that can include a glass phase. In an exemplary embodiment, the composition of the oxide matrix 24 dictates the mole fraction of the glass and the $SiO_2$. The self-healing phase 28 can include a material having properties that are in thermodynamic equilibrium with $SiO_2$ during operation at predetermined temperatures. The self-healing phase 28 comprises a material having properties including the ability to flow into cracks 30 formed in the matrix 24 during operation at those predetermined temperatures. The self-healing phase 28 can be sufficiently fluid at high temperatures to flow into the cracks 30 in the coating 10, which imparts a self-healing functionality. The present disclosure is directed to aqueous slurry-based EBC application, and so the above composition or other compositions could be advantageously applied in this manner.

The aqueous-slurry based environmental barrier coating composition can be a mixture of water, binder, and oxidation protection phase, as would be known to a person having ordinary skill in the art, and can be as set forth above. These components can be provided in a broad range of ratios relative to each other, depending upon desired properties of the resultant coating.

The environmental barrier layer 18 can be applied to substrate 12 at a thickness of greater than or equal to about 0.5 mils (0.0005 inch), preferably between about 3 and about 30 mils and more preferably between about 3 and about 5 mils.

It is advantageous to apply the environmental barrier layer 18 to the surface 20 of the substrate 14 after the surface 20 has been treated and prepared to enhance wettability of the surface with an aqueous-slurry based fluid. Since surface 20 can have organic contaminants which can be hydrophobic, these contaminants can be problematic for a number of reasons, some related to the aqueous materials used in the method for application of the environmental barrier layer 18. The organic contaminants can be removed from the surface 20 via techniques such as plasma treatment. In order to obtain good adhesion of the environmental barrier layer 18 to the surface 20 it can be advantageous to enhance the properties of the surface 20.

In one aspect of the disclosure, the environmental barrier coating is applied in the form of an aqueous slurry. Application as a slurry allows relatively simple and uniform application of the EBC as desired, followed by curing into the final coating. However, good adherence to the surface of the substrate is important in providing a good bond of the coating to the substrate. Thus, treating the surface to enhance wettability can greatly improve overall adhesion of the resultant coating. Without such a treatment, the surface can be hydrophobic, resulting in poor dispersion or wetting of the aqueous slurry over the substrate to be coated, and poor quality coating.

Figure 3:
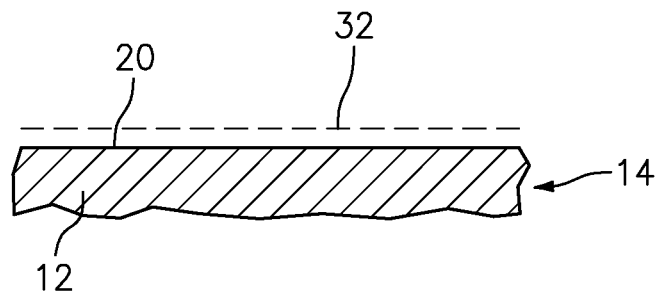
FIGS. 3-5 schematically illustrate steps in a method for applying an EBC as an aqueous slurry.

FIG. 3 shows a schematic representation of a surface 20 of a substrate 12 which has organic contaminants 32 on surface 20. As set forth above, such contaminants can typically be hydrophobic. Non-limiting examples of typical organic contaminants encountered during preparation of ceramic matrix component articles are absorbed hydrocarbons, oils from human handling (such as finger prints), lubricants from machining, residual hydrocarbon based contaminants from the process of making the substrate (for example through chemical vapor infiltration (CVI) or pre-ceramic polymer pyrolysis). When such an article is to be coated with an environmental barrier coating 10 or layer 18 (FIGS. 1, 2), one application method is application as an aqueous slurry. Such processes produce good quality coatings when there is good adhesion of the slurry with the surface. Of course, hydrophobic contaminants on the surface can interfere with such adhesion. Thus, it is desirable to treat the surface to be coated to adjust the wettability of the surface to aqueous based materials.

Figure 4:
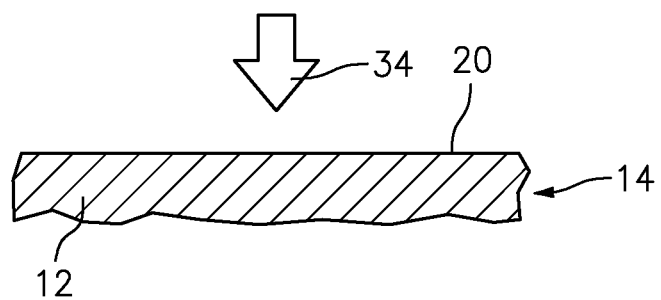
Figure 5:
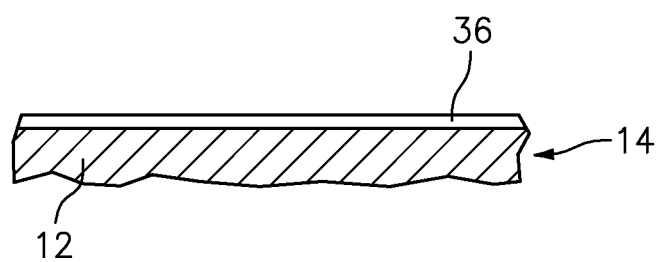

In one aspect of such adjustment of wettability, the surface of FIG. 4 can be treated, for example with a plasma treatment 34, to remove the organic contaminants 32 (already removed in FIG. 4) and produce a surface 20 which is more wettable to aqueous slurry-based materials.

FIG. 4 schematically illustrates a plasma treatment step 34 to remove organic contaminants 32. This plasma treatment step can be carried out using any plasma bath, jet, spray or other treatment method which results in removal of organic contaminants to adjust wettability of the surface to be coated. In a typical plasma treatment process, the part or parts having a substrate to be coated can be placed in a plasma chamber, and a vacuum can then be drawn in the chamber. A gas can be backfilled into the chamber at a partial pressure. Composition of the gas can be changed as desired to change the effect on the surface. In addition, other methods can be used to introduce reactive gases into the plasma chamber including but not limited to the use of at least one of fluorine gas, Sulphur hexafluoride, water vapor, hydrogen, chlorine gas, hydrochloric acid, argon, iodine monobromide, iodine monochloride and the like. Plasma is then generated, for example using RF excitation, to expose the desired surface to plasma and thereby alter the surface by removing organic contaminants.

Chemical species of the gas can create a significant effect. For example, on a silicon carbide substrate, HF gas may remove oxides on the substrate and provide a fresh surface, oxidizing gas may remove contaminants and may create a very controlled oxidized layer that increases wetting. Power used to create the plasma can also be varied to control the degree of surface modification. Low-pressure (high vacuum) conditions enhance the plasma etch rates and the use of vacuum better than $10^{-2}$-$10^{-6}$ atmospheres is desirable. In one configuration, the plasma is achieved in the system by applying a strong radio frequency electromagnetic field to the chamber.

After treatment step 34, wettability of surface 20 is now sufficiently adjusted that an aqueous slurry-based coating can be applied to surface 20, resulting in an even and well wetted layer 36 of aqueous slurry-based coating materials on surface 20 such that subsequent curing and finishing steps result in an environmental barrier coating having high adhesion to the underlying surface as desired. The treatment step can be conducted to produce a hydrophilic surface, which of course enhances wetting with an aqueous-slurry based coating composition. It is well-suited to the overall process to conduct the treatment step to produce a surface which has a contact angle with water and/or with an aqueous-slurry based coating composition or fluid of less than 40 degrees.

Along with the disclosed process for removing organic contaminants using plasma and other treatment, it is also within the scope of this disclosure to alter the surface by changing the oxidative state of the surface, which can also alter the wettability of the surface. The disclosed method can be used to adjust the wettability of a surface to be coated with aqueous slurry-based materials such that the aqueous slurry-based materials fully wet the surface. This promotes strong adhesion of the thus-applied coating, and enables the capability of the environmental barrier coating system to endure higher thermal gradients, retain larger coating thickness, longer coating life, and higher resistance to spallation.

There has been provided a method of adjusting wettability of a surface for an environmental barrier coating. While the coating has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A method for coating a ceramic matrix composite substrate with an environmental barrier coating, comprising the steps of:
    treating a surface of a ceramic matrix composite substrate to adjust wettability of the surface to produce a hydrophilic surface, wherein the treating step is a plasma treating step conducted in a vacuum, wherein the vacuum is a pressure of between $10^{-2}$ and $10^{-6}$ atmospheres, wherein the surface has organic contaminants, and wherein the treating step removes the organic contaminants and adjusts wettability, the plasma treating step comprising:
        placing the substrate in a chamber,
        evacuating the chamber to the pressure between $10^{-2}$ and $10^{-6}$ atmospheres,
        introducing a process gas to the chamber, and
    generating plasma within the chamber; and
    applying an aqueous slurry-based environmental barrier coating to the surface, wherein the aqueous-based environmental barrier coating is applied as an aqueous slurry that wets the hydrophilic surface; and
    curing the aqueous slurry to produce the environmental barrier coating on the surface,
    wherein the plasma treating step etches the surface to produce an etched surface,
    wherein the plasma treating step produces a surface having a contact angle of less than 40 degrees with the aqueous slurry-based environmental barrier coating, and wherein the applying step comprises applying the aqueous slurry-based environmental barrier coating to the etched surface.

2. The method of claim 1, wherein the substrate is at least one of a turbine vane or a turbine blade.

3. The method of claim 1, wherein the organic contaminants comprise absorbed hydrocarbons, surface contaminants from handling, machining and packaging, and residual contaminants from the manufacturing process.

4. The method of claim 1, wherein the treating step comprises changing the oxidative state of the surface to adjust wettability of the surface.

5. The method of claim 1, wherein the process gas is selected from the group consisting of fluorine gas, Sulphur hexafluoride, water vapor, hydrogen, chlorine gas, hydrochloric acid, argon, IBr, ICl and combinations thereof.

6. The method of claim 1, wherein the aqueous slurry-based coating comprises a mixture of water, binder, and oxidation protection phase.

7. The method of claim 1, wherein the applying step is selected from the group consisting of spraying, dipping, electrophoretic application, painting and combinations thereof.

8. The method of claim 1, further comprising applying a protective layer over the environmental barrier coating.

9. The method of claim 1, wherein the substrate comprises a silicon carbide substrate, and wherein the process gas of the plasma treating step is hydrogen fluoride gas.

10. The method of claim 1, wherein the substrate comprises a silicon carbide substrate, and wherein the process gas of the plasma treating step is an oxidizing gas to create a controlled oxidized layer having the hydrophilic surface.

11. The method of claim 1, further comprising varying power used to generate plasma for the plasma treatment step to control a degree of surface modification.

12. The method of claim 1, wherein the plasma within the chamber is generated by applying a radio frequency electromagnetic field in the chamber wherein the plasma treatment step is conducted.

13. A method for coating a ceramic matrix composite substrate with an environmental barrier coating, comprising the steps of:
    treating a surface of a ceramic matrix composite substrate to adjust wettability of the surface, wherein the treating step is a plasma treating step conducted in a vacuum at a pressure of between $10^{-2}$ and $10^{-6}$ atmospheres to etch the surface and produce an etched surface, the plasma treating step comprising:
placing the substrate in a chamber,
evacuating the chamber to the pressure between $10^{-2}$ and $10^{-6}$ atmospheres,
introducing a process gas to the chamber, wherein the process gas is hydrogen fluoride gas, and
generating plasma within the chamber; and applying an aqueous slurry-based environmental barrier coating to the etched surface, wherein the substrate comprises a silicon carbide substrate.

\* \* \* \* \*